(12) United States Patent
Takeshima

(10) Patent No.: US 6,676,079 B2
(45) Date of Patent: Jan. 13, 2004

(54) PASSENGER AIRCRAFT

(76) Inventor: Yoshihito Takeshima, B-3 Green Pallet Higashi-Oizumi, 7-35-31, Higashi-Oizumi, Nerima-ku, Tokyo (JP)

( * ) Notice: Subject to any disclaimer, the term of this patent is extended or adjusted under 35 U.S.C. 154(b) by 0 days.

(21) Appl. No.: 10/252,590

(22) Filed: Sep. 24, 2002

(65) Prior Publication Data

US 2003/0062448 A1 Apr. 3, 2003

(30) Foreign Application Priority Data

Oct. 1, 2001 (JP) ........................................ 2001-305731

(51) Int. Cl.⁷ .............................................. B64D 11/05
(52) U.S. Cl. .............. 244/118.5; 244/120; 244/122 AH
(58) Field of Search ............. 244/117, 118.1, 244/118.5, 118.6, 119, 120, 121, 122 AG, 122 AH, 129.4, 137

(56) References Cited

U.S. PATENT DOCUMENTS

| | | | | |
|---|---|---|---|---|
| 1,731,531 A | * | 10/1929 | Gott | .......................... 244/118.6 |
| 3,680,499 A | | 8/1972 | Boudreau | |
| 3,704,845 A | * | 12/1972 | Ord | ............................ 244/121 |
| 3,811,643 A | | 5/1974 | Pizzo | |
| 5,201,830 A | * | 4/1993 | Braswell | .................. 244/118.5 |
| 5,816,534 A | * | 10/1998 | Schumacher | ................ 244/119 |
| 5,875,997 A | * | 3/1999 | Al-Sabah | ................. 244/118.5 |
| 6,213,427 B1 | * | 4/2001 | Mareska | ................. 244/118.5 |
| 6,474,599 B1 | * | 11/2002 | Stomski | ................... 244/118.5 |
| 2003/0006342 A1 | * | 1/2003 | Page | ....................... 244/118.5 |

FOREIGN PATENT DOCUMENTS

JP          HEI 6-56091          3/1994

* cited by examiner

*Primary Examiner*—Charles T. Jordan
*Assistant Examiner*—Stephen Holzen
(74) *Attorney, Agent, or Firm*—Snider & Associates; Ronald R. Snider

(57) ABSTRACT

A passenger aircraft so arranged that complete partition wall(s) is/are disposed in the manned space (e.g. a flight deck and a passenger cabin) of the aircraft fuselage so as to completely partition the manned space into at least two manned space sections which are completely isolated from each other. Hence, any hijacker is prevented by the partition wall(s) from his or her access to the manned space. Further, doors and lavatory are provided in the aircraft at points corresponding to such at least two isolated manned space sections, so that pilots, crews, flight attendants and passengers may not only find their own ways for egress from the aircraft and ingress thereto, but also have a wash and relieve themselves, for instance.

7 Claims, 4 Drawing Sheets

PASSENGER AIRCRAFT

RELATED APPLICATIONS

This application claims the priority of Japanese Patent Application No. 2001-305731, filed Oct. 1, 2001, which is incorporated herein by reference.

FIELD OF THE INVENTION

The present invention relates to a passenger aircraft, and in particular to a hijack or air-piracy prevention arrangement in the passenger aircraft, which is designed to protect pilots, passengers and crews against any invasion and attack by hijackers.

BACKGROUND OF THE INVENTION

A horrible terrorism disaster in the U.S.A., widely known as the crashes of hijacked airplanes into skyscrapers on Sep. 11, 2001, has remained in the minds of many people. Since that date, a severe security has been enhanced in many airports to prevent passenger aircraft from a sudden hijacking. In every airport, metal detection systems work to detect anything like metallic murderous weapons such as guns and knives hidden in each passenger who will enter the aircraft, thereby to insure preventing those dangerous things from being brought in the aircraft. However, it is of a high likelihood that anything excepting such metallic things, for example, a glass bottle or a necktie, may be used by a hijacker as a murderous weapon to threaten passengers or crews, or the hijacker per se might be a murderous weapon for the hijacking purpose if he or she acquires a skill of martial art such as boxing, judo or karate. For those reasons, only to enhance the checking of passenger's body and his or her personal belongings and baggage will not suffice to completely prevent hijacking of aircraft in advance before any potential hijacker enter the aircraft.

SUMMARY OF THE INVENTION

In view of the above-stated drawbacks, it is a purpose of the present invention to reduce hijack cases and incidental damages thereto.

In order to achieve such purpose, in accordance with the present invention, there is basically provided a passenger aircraft characterized in that a partition wall means is provided so as to completely partition a manned space into at least two independent manned space sections which are completely isolated from each other, and that a door means and a lavatory means are provided in either of the at least two completely independent manned space sections.

In one aspect of the invention, the manned space may include a flight deck where pilots control the passenger aircraft and a passenger cabin adapted to accommodate passengers therein, wherein one of the foregoing at least two independent manned space sections is the flight deck and another them is the passenger cabin, and the partition wall means comprises a partition wall of a rigid property which is provided between the flight deck and passenger cabin so as to completely isolate the flight deck from the passenger cabin. In this instance, the door means may comprise a door provided in a portion of the passenger aircraft corresponding to the flight deck, thereby allowing pilots to enter and leave the flight deck through the door, independently of the passenger cabin, and further, the lavatory means may comprise a lavatory compartment defined in the flight deck.

In another aspect of the invention, the partition wall means may comprise at least one partition wall of a rigid property which is provided in the passenger cabin so as to completely partition the passenger cabin into at least two independent passenger cabin sections which are completely isolated from each other. Further, the door means may be provided in a portion of the passenger aircraft corresponding to the passenger cabin in such a manner as to allow ingress and egress of persons including the passengers to and from each the at least two independent passenger cabin sections through the door means, and also, the lavatory means may comprise a lavatory compartment defined in each of the at least two independent passenger cabin sections.

The above and other purposes, features and advantages of the present invention will become apparent from the following detailed description taken with the accompanying drawings.

DETAILED DESCRIPTION

Figure 1:
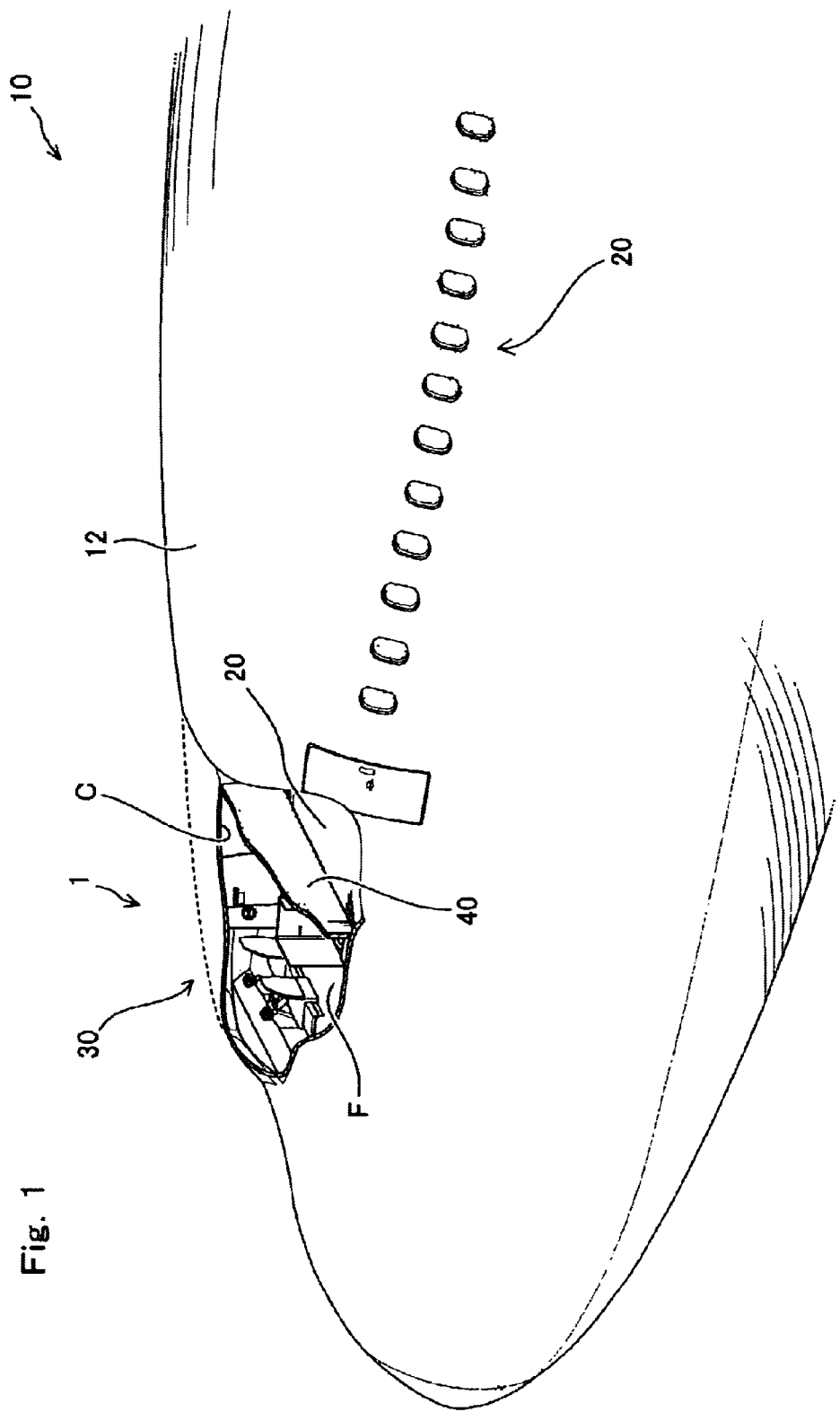
FIG. 1 is a partly broken schematic perspective view of a passenger aircraft, which shows a first exemplary embodiment of air-piracy prevention arrangement in a flight deck of the passenger aircraft in accordance with the present invention.

FIGS. 1 to 4 illustrates some preferred exemplary embodiments of the present invention. Generically stated, in accordance with the present invention, there is provided an air-piracy prevention arrangement, as generally designated by 1, in a manned space (i.e. a cockpit or flight deck, crew rooms, passenger cabins and the like) of a passenger aircraft 10, the air-piracy prevention arrangement being designed to protect pilots, crews, flight attendants and passengers against a possible attack from hijackers, as will be elaborated with several exemplary embodiments possible within the gist and scopes of the present invention. The passenger aircraft 10 is a known ordinary aircraft comprising a fuselage, two main wings, a tail unit, turbojet engines and the like. In all the figures, designation 12 denotes a fuselage of the aircraft 10. A cockpit or flight deck 30 is provided in the forward upper area of the aircraft 10 adjacent to the nose portion thereof, whereas a passenger cabin 20 is defined in substantially a whole of the fuselage 12.

Figure 2:
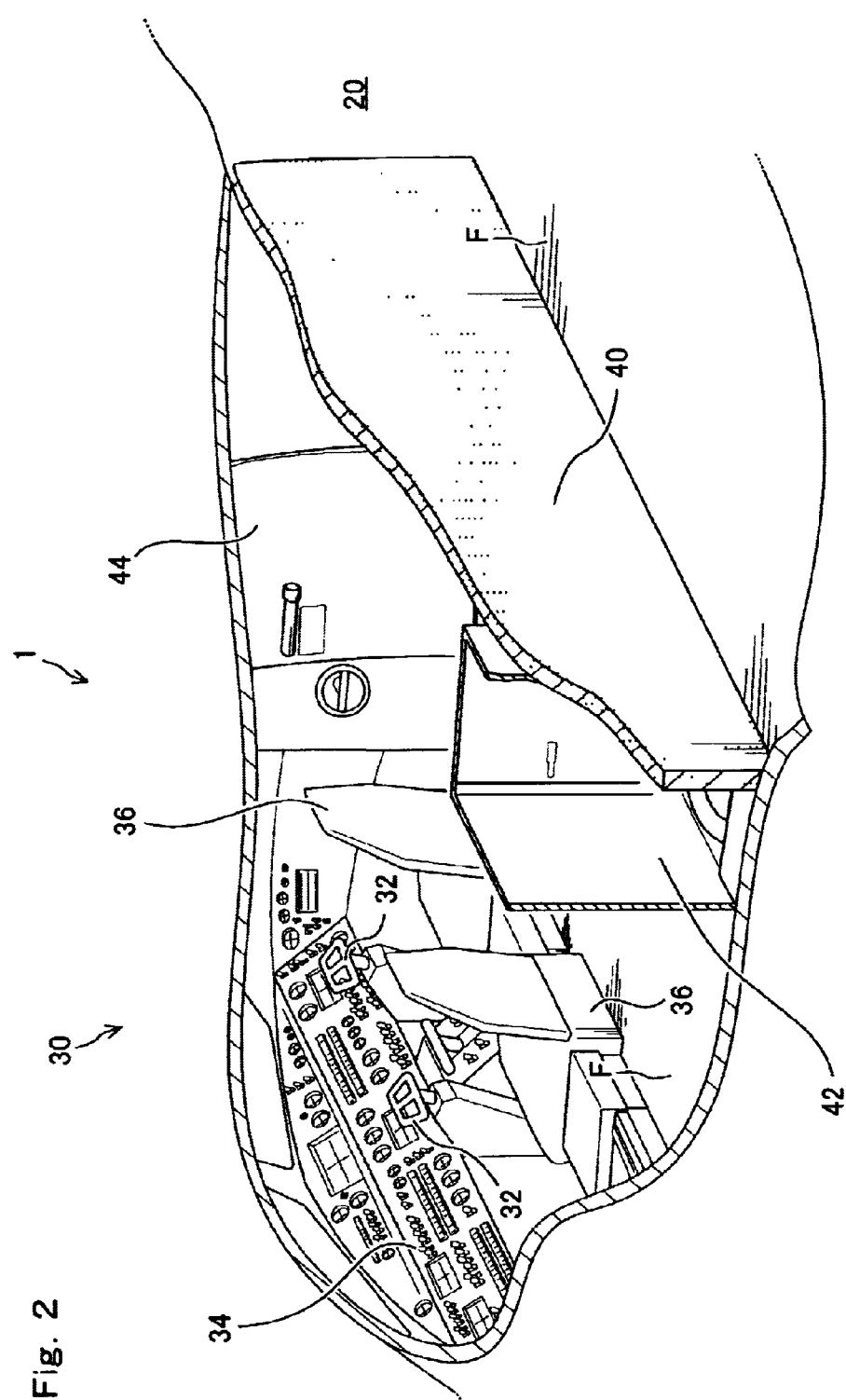
FIG. 2 is a fragmentary enlarged perspective view of the flight deck shown in the FIG. 1.

Reference is made to FIGS. 1 and 2 showing a first exemplary embodiment, according to which, the air-piracy prevention arrangement 1 is provided in the flight deck 30. As is known, in the flight deck 30, there are provided two control wheels 32, two pilot's seats 36, a control panel 34 incorporating various meters, indicators and switches, and so forth. The illustrated mode of air-piracy prevention arrangement 1 defined within a space of such flight deck 30 is basically comprised of a complete partition wall 40; a lavatory compartment (rest room) 42; and a special door 44 (an emergency door) adapted for allowing ingress and egress of pilots (and associated crews) to and from the flight deck 30 therethrough. Hitherto, a simple partition wall and a door have been provided between the flight deck 30 and the passenger cabin 20, which may allow anyone to gain access to the flight deck 30. As shown, in accordance with the present invention, the complete partition wall 40 is disposed at a point between the flight deck 30 and passenger cabin 20 so as to define a vertical wall therebetween. The wall 40 not only extends vertically from a floor F to a ceiling C, but also extends transversely of the flight deck 30 from the left wall to right wall of the fuselage 12, whereupon the flight deck 30 and passenger cabin 20 are completely separated and isolated from each other. In other words, the flight deck 30 and passenger cabin 20 are completely partitioned into two isolated and independent rooms so that anyone in the passenger cabin 20 can not gain any access to the flight deck 30. The complete partition wall 40 is formed from a hard material, such as duralumin, which has a high strength and thickness enough to withstand a force applied from hijackers who intend to destroy the wall.

According to this mode of arrangement, it is appreciated that pilots have to use the special door 44 to enter or leave the flight deck 30 therethrough, which means that the pilots do not have to go through the passenger cabin 20, but they can directly enter or leave the flight deck 30 through the door 44. Further, the pilots can use the lavatory compartment 42 to have a wash, relieve themselves or change their cloths therein. Of course, a certain supply of foods, meals and drinks (the so-called in-flight meals) may be stored in a proper manner within this completely partitioned flight deck 30 in order that the pilots may eat them at any time. With such arrangement, the pilots can concentrate their works to control the aircraft 10, independently of the passenger cabin 20, without any inconveniences, and, even if a hijacking occurs in the aircraft 10, hijacker(s) can find no way for access to the flight deck 30 due to the presence of the complete partition wall 40 between the flight deck 30 and passenger cabin 20. Therefore, it is possible to avoid such an unexpected case where the hijackers will occupy the flight deck 30 and seize control of both aircraft and pilots.

Figure 3:
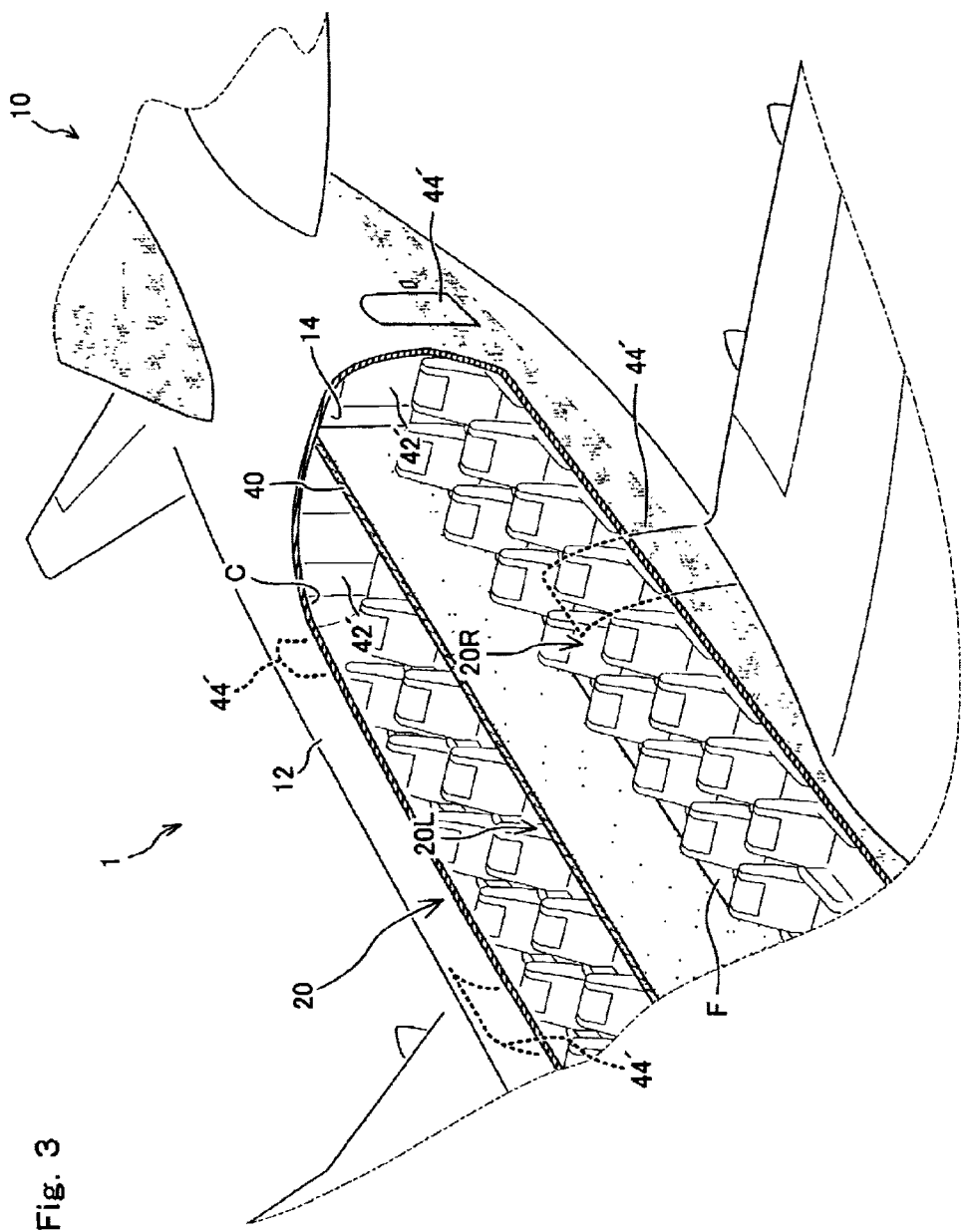
FIG. 3 is a partly broken fragmentary perspective view showing a second exemplary embodiment of the air-piracy prevention arrangement in a passenger cabin.

FIG. 3 shows a second exemplary embodiment wherein the complete partition wall 40 may be provided in the passenger cabin 20. As can be seen from FIG. 3, it may be so arranged that the complete partition wall 40 not only extends vertically from the floor F to the ceiling C, but also extends along the central axis of fuselage 12 in the fore-and-aft direction of aircraft 10, i.e. from the rearmost wall 14 to another partition wall (not shown) in the passenger cabin 20, thereby completely partitioning the passenger cabin 20 into two symmetrically isolated cabin sections 20L and 20R relative to the wall 40. Hence, it is seen that such completely partitioned two (left-side and right-side) passenger cabin sections 20L and 20R extend along the longitudinal direction of fuselage 12 of aircraft 10. Of course, as indicated by the solid and phantom lines in FIG. 3, several emergency doors 44' may be provided in both lateral sides of fuselage 12 so that passengers can get out of and enter the aircraft 10 through the doors 44' for escape purpose, or special forces and the like can enter the aircraft through the doors 44' for attack against the hijackers. Further, at least one lavatory compartment 42' may be provided in each of the two isolated passenger cabin sections 20L and 20R, as illustrated, to allow passengers to have a wash, relieve themselves, change their cloths and so forth therein.

Figure 4:
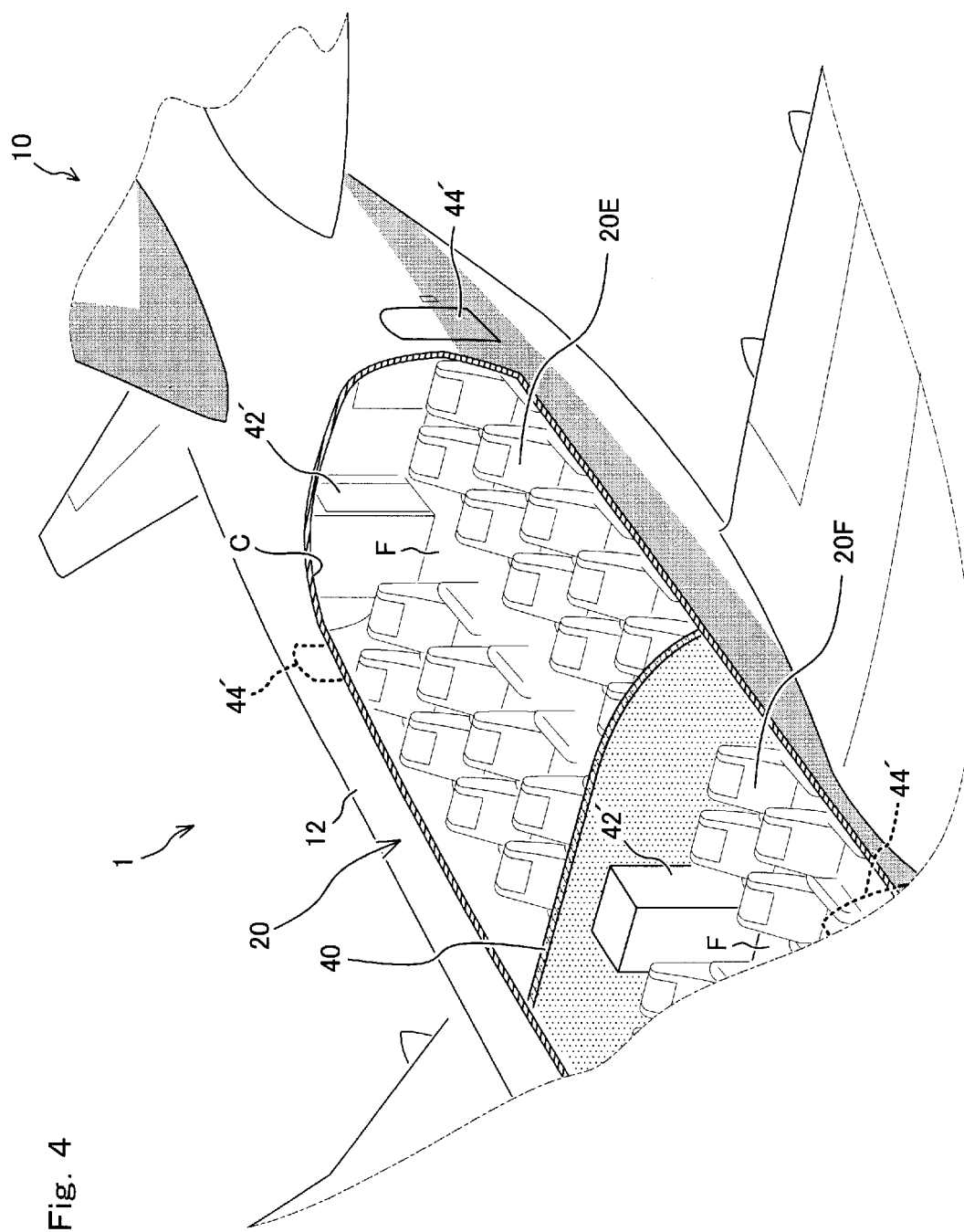
FIG. 4 is a partly broken fragmentary perspective view showing a third exemplary embodiment of the air-piracy prevention arrangement in the passenger cabin.

FIG. 4 shows a third exemplary embodiment wherein, instead of the second embodiment, the complete partition wall 40 may be arranged in the passenger cabin 20 in a direction transversely of the fuselage 12 so as to completely partition the passenger cabin 20 into forward and rearward cabin sections which are completely isolated from each other in the fuselage 12. For example, as understandable from FIG. 4, the complete partition wall 40 be disposed between the first-class section 20F and the economy-class section 20E, such that the wall 40 extends vertically from a floor F to a ceiling C and also extends transversely of the passenger cabin 20, i.e. from the left wall to right wall of the fuselage 12, whereupon the first-class and economy-class sections 20F, 20E are completely isolated by the wall 40 from each other. Needless to mention, as similar to the second embodiment, as indicated in FIG. 4, several emergency doors 44' may be provided in both lateral sides of fuselage 12 at points corresponding to the first-class and economy-class sections 20F, 20E, respectively. In that instance, the passengers can get out of and enter the aircraft 10 through the doors 44', or special forces and the like can enter the aircraft 10 through the doors 44' for attack against the hijackers. Further, at least one lavatory compartment 42' may be provided in each of the two sections 20F, 20E to enable passengers in each of the two partitioned sections 20F, 20E to have a wash, relieve themselves, change their cloths and so forth in the lavatory compartment.

While not shown, a galley module or food storage may be provided in both of the second and third embodiments described above in order that passengers can easily eat some foods and meals (in-flight means) cooked or stored in the galley module or food storage at any time. Namely, in the second embodiment, a galley module or food storage be installed at a proper area in each of the two partitioned cabins 20L, 20R. On the other hand, in the third embodiment, a galley module or food storage be installed at a proper area in each of the partitioned first-class and economy-class sections 20F, 20E.

From the descriptions above, it is appreciated that, in accordance with the present invention, the aircraft with the air-piracy prevention arrangement 1 has the following effects and advantages:

(1) As suggested in the first embodiment, the provision of a complete partition wall between the flight deck and passenger cabin effectively insures to preclude any hijacker in the passenger cabin from his or her access to or invasion on the flight deck, which therefore eliminates the possibility that the hijacker(s) will seize full control of the flight deck.

(2) Further, as suggested in the second and third embodiments, the complete partition wall may be arranged in the passenger cabin so as to partition that particular passenger cabin into two or more isolated cabin sections, thereby not only attaining several safe cabin sections without any hijacker therein to protect as many passengers as possible from direct attack by the hijacker, but also restricting the hijacker's action to small area of one of the partitioned cabin sections. This is also effective in dispersing a plurality of hijackers into each of the partitioned cabin sections and blocking cooperation and communications among the hijackers.

It is noted that the above-stated air-piracy prevention arrangement can be enhanced by deploying some security guards in each of the thus-partitioned passenger cabin sections so as to watch and find any hijacker lurking in the passenger cabin sections, who pretends to be an ordinary passenger, and therefore such potential hijacker can not begin his or her air piracy or will be found easily by the security guards if he or she shows any suspicious action.

Finally, it should be understood that the present invention is not limited to the illustrated embodiments, but any other modification, replacement and addition may be applied thereto without departing from the scopes of the appended claims. For example, the partition of passenger cabin is not limited to the illustrated embodiments shown in FIGS. 3 and 4, but a plurality of complete partition walls may be arranged in the passenger cabin in any desired manner to effectively partition the passenger cabin into a plurality of isolated and independent cabin sections, as required.

What is claimed is:

1. A passenger aircraft having a fuselage and a manned space in the fuselage, characterized in that a partition wall having no openings for human access is provided in said manned space so as to completely partition the manned space into at least two independent manned space sections which are completely isolated from each other, and that a door means and a lavatory means are provided in either of said at least two completely independent manned space sections, wherein persons in one manned space section are prevented by the partition wall from access to another space section.

2. The passenger aircraft as claimed in claim 1, wherein said manned space includes: a flight deck where pilots control the passenger aircraft; and a passenger cabin adapted to accommodate passengers therein, wherein one of said at least two independent manned space sections is said flight deck and another of said at least two independent manned space sections is said passenger cabin, wherein said partition wall comprises a partition wall of a rigid property which is provided between said flight deck and said passenger cabin so as to completely isolate the flight deck from the passenger cabin, wherein said door means comprises a door provided in a portion of the passenger aircraft corresponding to said flight deck, thereby allowing pilots to enter and leave the flight deck through the door, independently of said passenger cabin, and wherein said lavatory means comprises a lavatory compartment defined in the flight deck.

3. The passenger aircraft as claimed in claim 1, wherein said manned space includes a passenger cabin adapted to accommodate passengers therein, wherein said passenger cabin is completely partitioned by said partition wall means into at least two independent passenger cabin sections which are completely isolated from each other, wherein said at least two independent manned space sections comprise said at least two independent passenger cabin sections, respectively, wherein said partition wall means comprises at least one partition wall of a rigid property which is provided in said passenger cabin so as to completely partition the passenger cabin into said at least two independent passenger cabin sections, wherein said door means is provided in a portion of the passenger aircraft corresponding to each of said at least two independent passenger cabin sections in such a manner as to allow ingress and egress of persons including said passengers to and from said each of said at least two independent passenger cabin sections through the door means, and wherein said lavatory means comprises a lavatory compartment defined in said each of said at least two independent passenger cabin sections.

4. A passenger aircraft including a flight deck where pilots control the passenger aircraft and a passenger cabin adapted to accommodate passengers therein, wherein a partition wall having no openings for human access is provided between said flight deck and said passenger cabin so as to completely isolate the flight deck from the passenger cabin, wherein an exterior door is provided in a portion of the passenger aircraft corresponding to said flight deck, thereby allowing said pilots to enter and leave said flight deck through the door, independently of said passenger cabin, wherein a lavatory means is provided in said flight deck, wherein a partition wall having no openings for human access is also provided in said passenger cabin so as to completely partition the passenger cabin into at least two independent passenger cabin sections which are completely isolated from each other, wherein a passenger exterior door is also provided in a portion of the passenger aircraft corresponding to each of said at least two independent passenger cabin sections in such a manner as to allow ingress and egress of persons including said passengers to and from said each of said at least two independent passenger cabin sections through the passenger exterior door, and wherein said lavatory means is provided in said each of said at least two independent passenger cabin sections.

5. A passenger aircraft having a fuselage and a manned space in the fuselage, characterized in that a partition wall having no openings for human access is provided in said manned space so as to completely partition the manned space into at least two independent manned space sections which are completely isolated from each other, and that a door means and a lavatory means are provided in either of said at least two completely independent manned space section wherein persons in one manned space section are prevented by the partition wall from access to another space section, wherein said partition wall is a single wall having no door or other opening which would allow a person in one manned space section to have access to the other.

6. The passenger aircraft as claimed in claim 5, wherein said manned space includes: a flight deck where pilots control the passenger aircraft; and a passenger cabin adapted to accommodate passengers therein, wherein one of said at least two independent manned space sections is said flight deck and another of said at least two independent manned space sections is said passenger cabin, wherein said partition wall comprises a partition wall of a rigid property which is provided between said flight deck and said passenger cabin so as to completely isolate the flight deck from the passenger cabin, wherein said door means comprises a door provided in a portion of the passenger aircraft corresponding to said flight deck, thereby allowing pilots to enter and leave the flight deck through the door, independently of said passenger cabin, and wherein said lavatory means comprises a lavatory compartment defined in the flight deck.

7. The passenger aircraft as claimed in claim 5, wherein said manned space includes a passenger cabin adapted to accommodate passengers therein, wherein said passenger cabin is completely partitioned by said partition wall means into at least two independent passenger cabin sections which are completely isolated from each other, wherein said at least two independent manned space sections comprise said at least two independent passenger cabin sections, respectively, wherein said partition wall means comprises at least one partition wall of a rigid property which is provided in said passenger cabin so as to completely partition the passenger cabin into said at least two independent passenger cabin sections, wherein said door means is provided in a portion of the passenger aircraft corresponding to each of said at least two independent passenger cabin sections in such a manner so as to allow ingress and egress of persons including said passengers to and from said each of said at least two independent passenger cabin sections through the door means, and wherein said lavatory means comprises a lavatory compartment defined in said each of said at least two independent passenger cabin sections.

* * * * *